US012332819B2

(12) United States Patent
Weedermann

(10) Patent No.: US 12,332,819 B2
(45) Date of Patent: Jun. 17, 2025

(54) SERIAL-OVER-IP ADAPTER ENRICHED WITH VIRTUAL USB MEDIA SUPPORT

(71) Applicant: Vertiv IT Systems, Inc., Huntsville, AL (US)

(72) Inventor: Joerg Weedermann, Santa Clara, CA (US)

(73) Assignee: Vertiv Corporation, Westerville, OH (US)

( * ) Notice: Subject to any disclaimer, the term of this patent is extended or adjusted under 35 U.S.C. 154(b) by 83 days.

(21) Appl. No.: 17/949,612

(22) Filed: Sep. 21, 2022

(65) Prior Publication Data

US 2023/0097472 A1 Mar. 30, 2023

Related U.S. Application Data

(60) Provisional application No. 63/248,076, filed on Sep. 24, 2021.

(51) Int. Cl.
*G06F 13/38* (2006.01)
*G06F 8/65* (2018.01)
*G06F 13/42* (2006.01)

(52) U.S. Cl.
CPC .............. *G06F 13/385* (2013.01); *G06F 8/65* (2013.01); *G06F 13/4282* (2013.01)

(58) Field of Classification Search
CPC .......................................................... G06F 8/65
See application file for complete search history.

(56) References Cited

U.S. PATENT DOCUMENTS

| 8,150,973 | B2* | 4/2012 | Diamant | G06F 13/385 |
| | | | | 709/227 |
| 8,560,743 | B2* | 10/2013 | Bunger | G06F 3/038 |
| | | | | 710/33 |
| 9,116,821 | B2* | 8/2015 | Scragg, Jr. | G06F 13/385 |
| 11,829,446 | B2* | 11/2023 | Solmaz | G06F 18/22 |
| 2004/0221145 | A1* | 11/2004 | Bolen | G06F 3/023 |
| | | | | 713/1 |
| 2007/0143479 | A1* | 6/2007 | Putnam | G06F 21/10 |
| | | | | 709/226 |
| 2008/0294915 | A1* | 11/2008 | Juillerat | H04L 12/40045 |
| | | | | 713/300 |
| 2009/0157941 | A1* | 6/2009 | Bolan | H04L 41/0886 |
| | | | | 711/6 |
| 2015/0269015 | A1* | 9/2015 | Baker | G06F 9/4405 |
| | | | | 714/48 |
| 2015/0341185 | A1* | 11/2015 | Keller | H04W 4/70 |
| | | | | 700/86 |

(Continued)

*Primary Examiner* — Henry Tsai
*Assistant Examiner* — Aurangzeb Hassan
(74) *Attorney, Agent, or Firm* — Suiter Swantz IP

(57) ABSTRACT

The present disclosure is a system and method for transmitting management data between a client computer and a remote device within a network. The system and method for transmitting management data between a client computer and a remote device within a network may include an adapter configured to receive a data stream from the client computer, separate the stream into user data and management data, and send the user data and the management data to different ports of the remote device. The adapter also includes a storage element capable of storing the management data and transmitting the management data to the remote device upon an input from the client computer.

20 Claims, 4 Drawing Sheets

(56) References Cited

U.S. PATENT DOCUMENTS

| | | | |
|---|---|---|---|
| 2017/0270301 A1* | 9/2017 | Vidyadhara | G06F 9/4411 |
| 2017/0351638 A1* | 12/2017 | Chen | G06F 13/4282 |
| 2018/0165455 A1* | 6/2018 | Liguori | G06F 21/57 |
| 2018/0218141 A1* | 8/2018 | Biesecker | G06F 21/575 |
| 2022/0252485 A1* | 8/2022 | Strudwicke | G01M 99/005 |
| 2022/0350628 A1* | 11/2022 | Parry-Barwick | H04L 9/3247 |

* cited by examiner

SERIAL-OVER-IP ADAPTER ENRICHED WITH VIRTUAL USB MEDIA SUPPORT

PRIORITY

This application claims priority to U.S. Provisional Application No. 63/248,076 filed Sep. 24, 2021, which is incorporated by reference herein in its entirety. Any and all applications for which a foreign or domestic priority claim is identified in the Application Data Sheet as filed with the present application are hereby incorporated by reference under 37 CFR 1.57.

TECHNICAL FIELD

The present disclosure relates generally to data flow in networking, and more particularly to optimizing data flow and labor inputs for headless servers using serial console redirection.

BACKGROUND

Data networks often utilize redirection to affect communication between different computers within the network, such as between a client and remote servers. For example, a remote server may receive signals provided from a client keyboard or client mouse, which are then processed using the application(s) on the remote server, and a video image response is returned to the client, thus creating a back-and-forth communication pipeline between the client and the remote server. This keyboard, video and mouse (KVM) redirection may further utilize a virtual USB drive to copy or install data (e.g., firmware, update images) to the remote server.

Headless servers (i.e., servers without monitor, keyboard, mice, or other interfacing peripherals) are commonly used in data and computation-heavy networks. These servers, as well as other networking infrastructure appliances (e.g., switches, routers), are conventional targets for serial console redirection, and have less need for the more complex and expensive KVM redirection hardware. However, many devices that utilize serial console redirection regularly require the manual transfer of data to the remote machine directly, such as through a USB thumb drive. This process is labor intensive, as it requires the employment of an on-site technician.

Accordingly, it may be advantageous for a system and method to remedy the shortcomings of the conventional approaches identified above.

SUMMARY

Accordingly, the present disclosure is directed to a system and method for transmitting management data between a client computer and a remote device within a network. The system and method for transmitting management data between a client computer and a remote device within a network may include an adapter configured to receive a data stream from the client computer, separate the data stream into user data and management data, and send the user data and the management data to different ports of the remote device. The adapter also includes a storage element capable of storing the management data and transmitting the management data to the remote device upon an input from the client computer.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Figure 1:
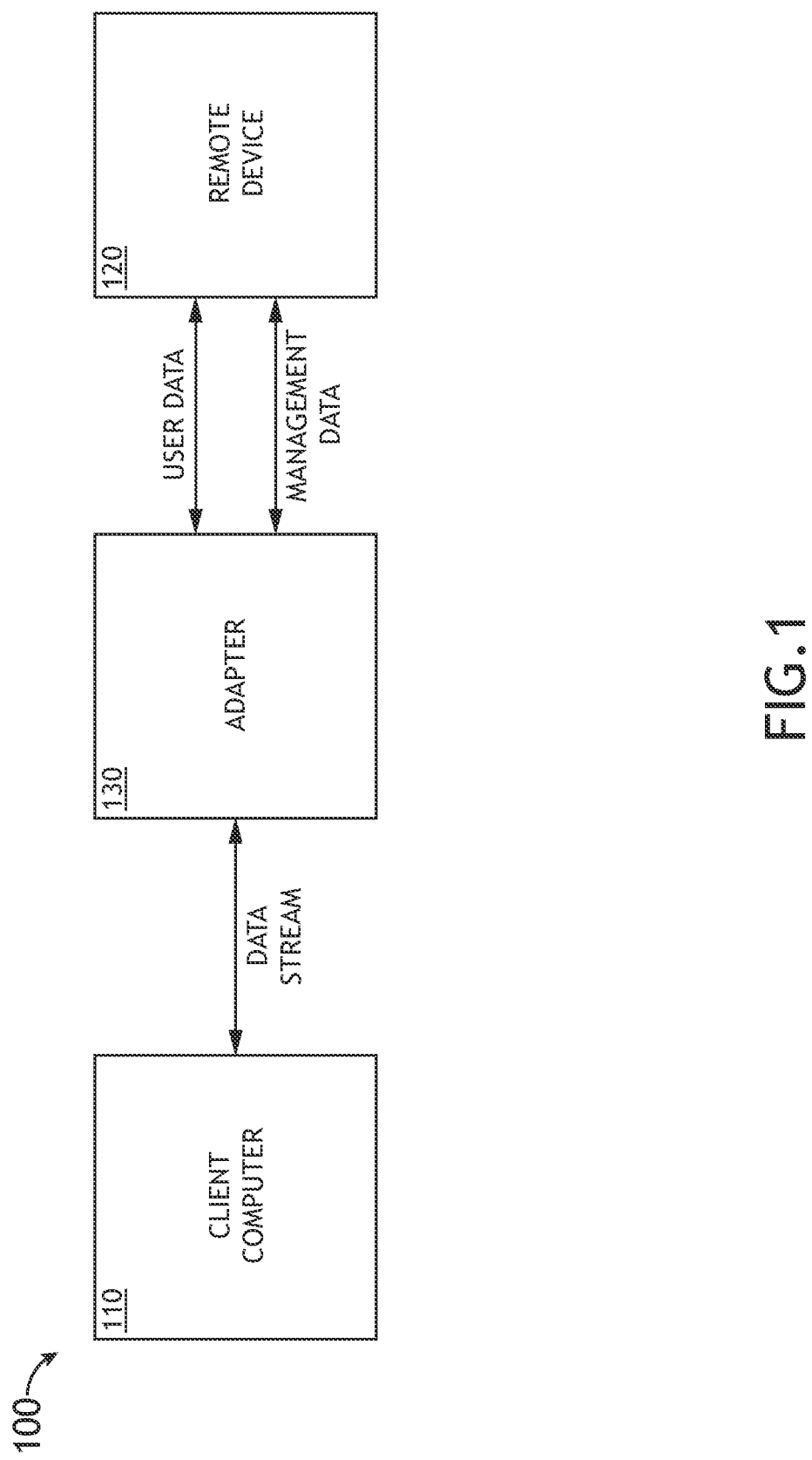
FIG. 1 depicts a block diagram of a system for transferring user data and management data between a client computer and a remote device in accordance with an embodiment of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "embodiments" means that a particular element, feature, structure, or characteristic described in connection with the embodiment is included in at least one embodiment disclosed herein. The appearances of the phrase "in embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Disclosed is a system and method for a serial-over-IP adapter configured to enable transmission of data (e.g., data packets) from a serial port of a client computer to a remote device, and vice versa. The adapter facilitates the transfer of user data (e.g., media, client information data, task-oriented data) between the client computer and the remote device while also facilitating a separate transfer of management data (e.g., firmware) between the client computer and the remote device. The adapter includes a storage element that facilitates storage of management data as well as a management data interface that facilitates separated flow of user data and management data to the remote device, which is controlled by the client computer. In this manner, firmware updates and other management data may be facilitated via the client computer (e.g., via a USB dongle plugged into the client computer) without the need of a technician to physically plug the USB dongle into the remote device directly.

Referring to FIG. 1, a block diagram of a system 100 for transferring user data and management data between a client computer 110 and a remote device 120 in accordance with an embodiment of the present disclosure is shown. Client computer 110 and remote device 120 may each be configured as any type of computer or computer system having network capabilities. In this system, the client computer 110 sends a stream of data (e.g., a data stream of data packets) to an adapter 130. For example, client computer 110 may send serial data to the adapter 130 via the client computer's USB or COM port. The data stream is configured to contain user data or management data, depending on system conditions. The adapter 130 may route the data stream to the appropriate port of the remote device 120, allowing the remote device 120 to process user data and management data independently of each other. For example, the data stream may include user data that is transferred through a RS-232 compatible port on the remote device 120. In another example, the data stream may include management data that is transferred through a universal serial bus (USB) port on the remote device 120. The client computer 110 and the remote device 120 may be communicatively coupled to the adapter 130 via any combination of ports and port-types.

The remote device 120 may be configured as any hardware configured to receive software or firmware updates including, but not limited to, servers (e.g., server computers), managed network switches, routers, power supplies, power distribution units (PDUs) and edge location data center equipment, such as uninterruptible power supplies (UPS). For example, the remote device 120 may be configured as a headless server, lacking a keyboard, mouse, and display. It should be understood that the remote device 120 may be physically separated from the client computer 110 by any distance (e.g., ranging from 10 cm to 15,000 km).

Figure 2:
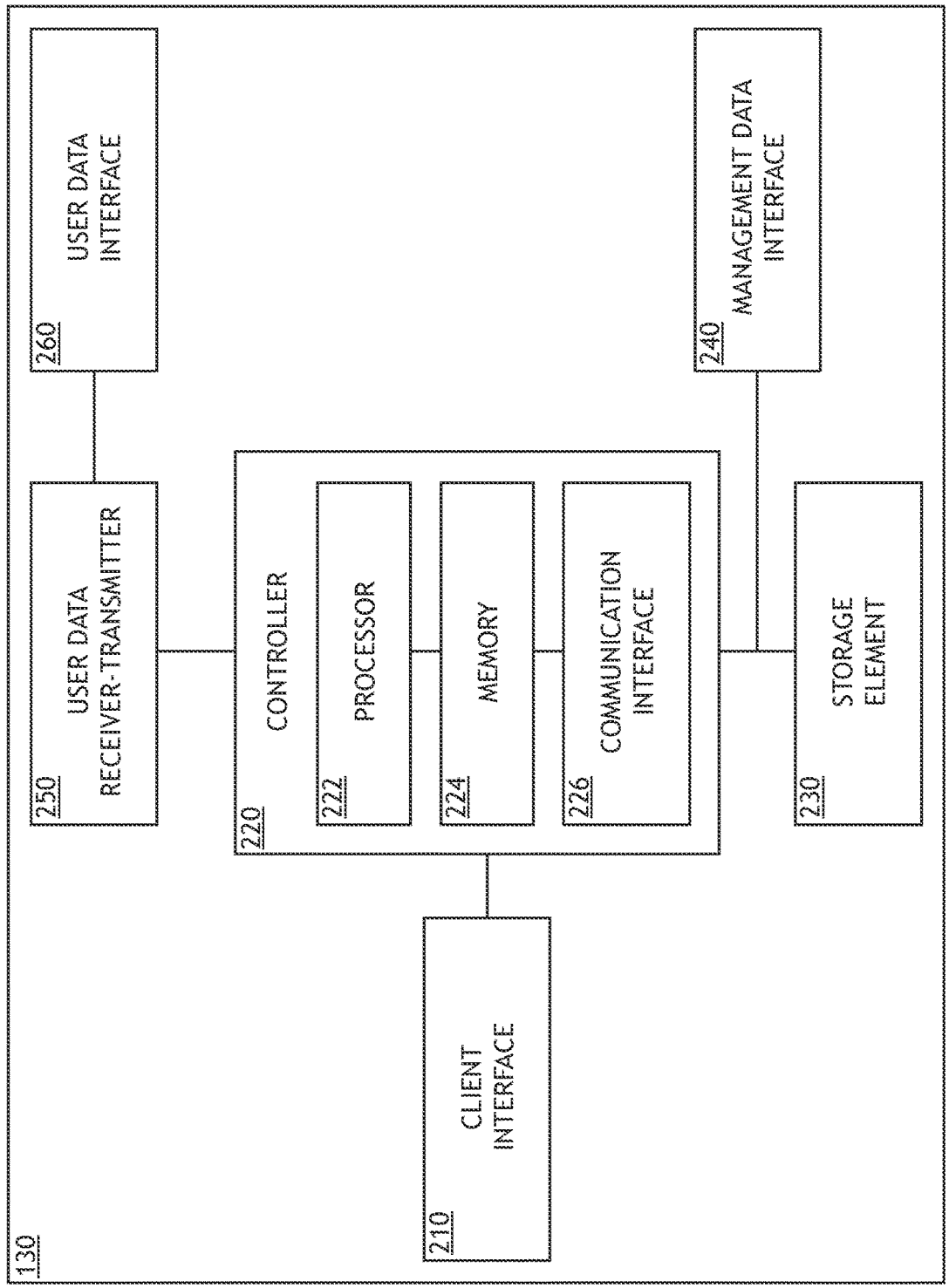
FIG. 2 depicts a block diagram of an adapter in accordance with an embodiment of the present disclosure.

Referring to FIG. 2, a block diagram of an adapter 130 in accordance with an embodiment of the present disclosure is shown. The adapter 130 may be configured as any form or form factor. For example, the adapter 130 may be configured as a dongle with one or more interfaces built into a housing. In another example, the adapter 130 may be configured as a dongle, with one or more interfaces extending from the housing via a cable. The dongle may be of any size. For example, the dongle may be configured with a size approximate to a USB flash drive. In another example, the dongle may be configured with a size approximate to a disc drive or a deck of cards. In another example, the dongle may be configured as an internal device within the housing of the remote device 120.

In embodiments, the adapter 130 may include a client interface 210 configured to couple to a communication port of client computer 110. The client interface 210 may be configured as any type of serial interface utilized for any type of communication protocol as described herein including, but not limited to, Ethernet interfaces or Internet interfaces. For example, the client interface 210 may be configured as an IEEE 802.3 standard LAN interface. In another example, the client interface 210 may be configured as a USB interface.

In embodiments, the adapter 130 further includes a controller 220 communicatively coupled to the client interface 210 and configured to perform one or more functions of the adapter 130, such as receiving user data (e.g., serial user data) and/or management data (e.g., virtual media management data), and routing the data to the appropriate port. The controller 220 may include a processor 222, a memory 224, and a communication interface 226.

It is contemplated that processor 222 may include any type of processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, processor 222 may include any device configured to execute algorithms and/or instructions (e.g., program instructions stored in memory). In one embodiment, processor 222 may be embodied as a desktop computer, mainframe computer system, workstation, image computer, parallel processor, networked computer, or any other computer system configured to execute a program configured to operate or operate in conjunction with the system, as described throughout the present disclosure. Moreover, different subsystems of the system may include a processor or logic elements suitable for carrying out at least a portion of the steps described in the present disclosure. Therefore, the above description should not be interpreted as a limitation on the embodiments of the present disclosure but merely as an illustration.

Memory 224 may be an example of tangible, computer-readable storage medium that provides storage functionality to store various data and/or program code associated with operation of the controller 220 and/or other adapter components, such as software programs and/or code segments, or other data to instruct the controller 220, processor 222 and/or adapter elements to perform (e.g., cause the processor 222 to perform) the functionality described herein. Thus, the memory 224 can store data, such as a program of instructions for operating the adapter 130 and/or adapter components. It should be noted that while a single memory is described, a wide variety of types and combinations of memory (e.g., tangible, non-transitory memory) can be employed. The memory 224 may be integral with the controller 220, can comprise stand-alone memory, or can be a combination of both. Some examples of the memory 224 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The controller 220 may further include a communication interface 226. The communication interface 226 may be operatively configured to communicate with components of the controller 220 and other adapter components. For example, the communication interface 226 can be configured to retrieve data from the controller 220 or other adapter components, transmit data for storage in the memory 224, retrieve data from storage in the memory 224, and so forth. The communication interface 226 can also be communicatively coupled with controller 220 and/or adapter elements to facilitate data transfer between adapter elements components of the adapter 130.

In embodiments, the adapter 130 may include a storage element 230 configured to receive and store management data (e.g., firmware, update images, log files) from the controller 220. The storage element 230 may be configured as a stand-alone component or as combined with the controller 220 or another adapter component. The storage element 230 is composed of memory units, and may include any number or type of memory as described herein including but not limited to RAM, ROM, flash memory, a memory card, a mini-SD memory card, and/or a micro-SD memory card, solid-state drive (SSD) memory, magnetic memory, optical memory, USB devices, and so forth. Once management data has been stored on the storage element 230, the storage element 230 may transmit the management data automatically (e.g., upon full receipt of the management data or upon a specific time or condition specified within the management data) or as directed by the client computer 110. For example, the client computer 110 may send firmware updates to the adapter 130, where they are stored within the storage element 230 until a predetermined time. For instance, the firmware updates may be transferred to the remote device 120 during periods of low use or inactivity, such as during non-business hours. In some embodiments, the storage element 230 may further include one or more processors to facilitate storage element function, such as transfer of management data to the remote device 120.

In embodiments, the adapter 130 may include a management data interface 240 communicatively coupled to the storage element 230 and configured to interface with the remote device 120 directly (e.g., via a USB male connector) or indirectly via a cable. The management data interface 240 may be configured as any type of port for the transmittal of management data including but not limited to CAN, RS-232, RS-485, RS-422, I2C, I2S, LIN, SPI, SMBus, and USB interfaces. For instance, the management data interface 240 may be configured as any type of USB interface including but not limited to USB 2.0, USB-A, USB-A SuperSpeed, USB-B, USB-B SuperSpeed, USB Mini-A, USB Mini-AB, USB Mini-B, USB Micro-AB, USB Micro-B, USB 3.0/Micro-B SuperSpeed, USB-C. In particular, the management data interface 240 may be configured as a microUSB port. In embodiments, a management data interface 240 is wired directly to a cable having a remote device-compatible port, such as a USB port.

In some embodiments, the controller 220 may be configured to send management data both to the storage element 230 and directly to the management data interface 240. For example, the controller 220 may send a firmware update that will be stored within the storage element 230 until a scheduled time in the future (e.g., one week), wherein the controller 220 or control elements in the storage element 230 will then send the firmware update to the management data interface 240 and subsequently to the remote device 120. However, before the scheduled time occurs, the controller 220 may also send directly to the management data interface 240 another firmware update (e.g., an emergency patch), bypassing the storage element 230.

In embodiments, the adapter 130 may further include a user data receiver-transmitter 250 communicatively coupled to the controller 220 and configured to receive user data from the controller 220. The user data receiver-transmitter 250 may be configured as any type of computer hardware device serial communication (e.g., asynchronous serial communication) including but not limited to a universal asynchronous receiver-transmitter (UART). The user data receiver-transmitter 250 may be configured as a stand-alone device or as combined with the controller 220 or other componentry of the adapter 130. For example, the user data receiver-transmitter 250 may be configured as an integrated circuit coupled to the controller 220.

In embodiments, the adapter 130 may further include a user data interface 260 coupled to the user data receiver-transmitter 250 and configured to interface with the remote device 120 directly (e.g., via a USB male connector) or indirectly via a cable (e.g., the cable having a connector that plugs into the remote device at a RS-232 compatible port). The user data interface 260 may be configured as any type of serial port as described herein. The user data interface 260 may be configured to either receive a cable (e.g., via any type of serial port as described herein), or may be wired directly to the cable.

Figure 3:
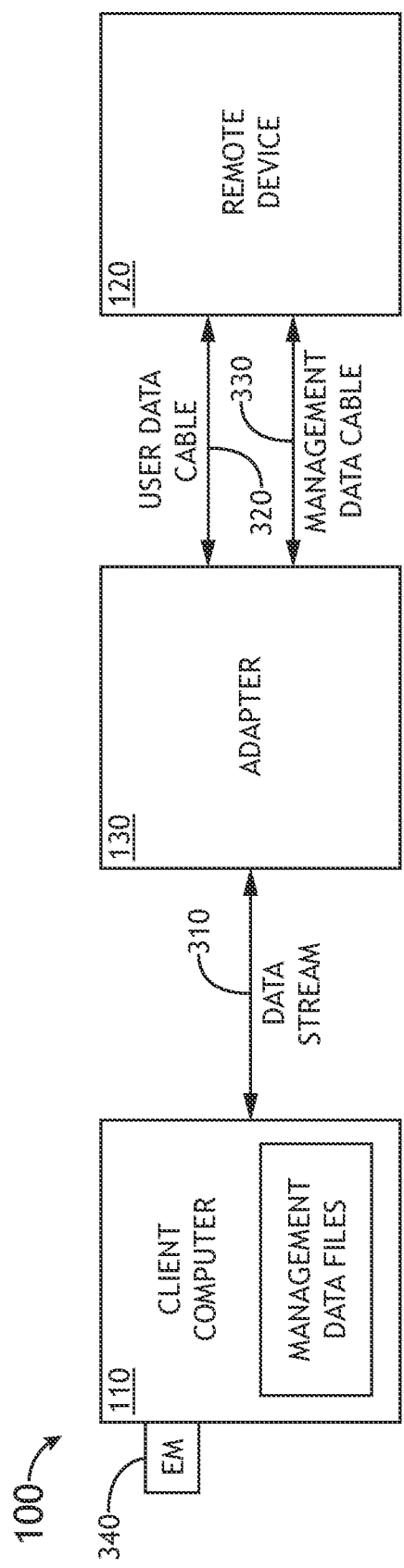
FIG. 3 depicts a block diagram of the system with associated cables and peripherals in accordance with an embodiment of the present disclosure.

Referring to FIG. 3, a block diagram of the system 100 with associated cables and peripherals in accordance with an embodiment of the disclosure is shown. In embodiments, the system 100 may include a data stream cable 310, a user data cable 320, and a management data cable 330 for transfer of the data stream, the user data, and the management data, respectively. The data stream cable 310, the user data cable 320, and the management data cable 330 may each be of any size or type known for transferring data and may be configured with any connector as described herein. The adapter 130 may be vended as a stand-alone device, or may be vended together with the data stream cable 310, the user data cable 320, and/or the management data cable 330.

Client computer 110 may use internally or externally sourced management data that is to be sent to the remote device 120. In embodiments, the client computer 110 may include internal memory configured to store management data files that may then be transferred via the data stream cable 310 to the adapter 130. For example, the client computer 110 may store management data files configured as .ISO files that contain firmware that can be sent to the adapter 130, wherein it may be stored within the storage element 230. For instance, the client computer 110 may be configured with data transfer software with graphical user interface (GUI) capability, such as a browser. A user may then direct the transfer of management data files to the adapter 130 and/or the remote device 120 via the browser software.

In embodiments, the system 100 may include an external memory (EM) 340 configured to store management data files and configured to physically and communicatively couple to the client computer 110. The external memory 340 may include any type of memory as described herein and may also include any type of form or form factor. For example, the external memory 340 may be configured as a memory stick (e.g., a USB thumb drive or USB dongle) that is configured for virtual USB. Virtual USB technology (e.g., a virtual connection protocol) is further described in U.S. Pat. No. 9,116,821 entitled "Method and System for USB device virtualization" filed by Scragg on Mar. 23, 2011, which is incorporated by reference in its entirety. For example, the external memory 340 may be configured such that once connected or plugged into the client computer 110, a user may direct management data files to be transferred to the adapter 130 and/or the remote device 120 as described herein. The external memory 340 may also be configured for automatic updating, wherein once plugged into the client computer, the management data files are automatically or semi-automatically (e.g., requiring few keyboard strokes or mouse clicks) transferred to the adapter 130 and/or the remote device 120. In embodiments, the external memory 340 is configured specifically for use with the adapter 130. The use of the external memory 340 at the client computer 110 obviates the need for directly installing firmware updates at the physical location of a remote device 120. No external USB-based drive or CD/DVD-ROM drive is then required at the remote device 120.

In embodiments, processor 222 of the controller 220 of the adapter 130 may execute instructions loaded into memory 224 that are included in an embedded firmware that are important for adapter function. For example, the firmware stack includes instructions for network connectivity. For instance, the firmware stack may provide instruction for generating and maintaining a websocket-based and transport security layer (TLS)-secured internet connect to the client computer 110 or an administrator computer (e.g., administrator's laptop). This network connectivity further facilitates interaction with the client's data transfer software or browser, providing a user interface to the user.

In another example, the firmware stack includes instructions for data transfer. In addition to facilitating data transfer between the client computer 110 (e.g., with or without external memory 340), the adapter 130, and the remote device 120 as described herein, the firmware stack may also facilitate selective or smart firmware transfer. For example, the firmware stack may instruct or permit loading of several firmware or update files (e.g., .ISO files) onto the storage element 230, with the adapter 130 executing the transfer of the appropriate firmware or update file to the remote device 120 at the appropriate time. In another example, the firmware stack may include instructions to detect malware and/or an improperly loaded or outdated firmware update.

In another example, the firmware stack and/or the external memory 340 and client computer memory may include instructions that facilitate authentication or multi-factor authentication (MFA) (e.g., that the client computer 110 has the proper authentication for accessing the remote device 120). For example, the system 100 may include a Smartcard or other USB-attached secure key device that may be plugged into the client computer 110. Data from the Smartcard or USB-attached secure key device (e.g. user authentication data) may then be securely transmitted through the client computer 110 to the remote device 120 through the adapter 130. The adapter 130 may provide virtual USB device emulation capacity to ensure a user is authenticated prior to transmitting user data or management data to the remote device 120.

In embodiments, the adapter 130 may be powered by any power source or technology. For example, the adapter 130 may be powered via a USB connection from the remote device 120. In another example, the adapter 130 may be powered by power-over-ethernet (PoE) technology. In another example, the adapter 130 may be powered via a separate power adapter.

Figure 4:
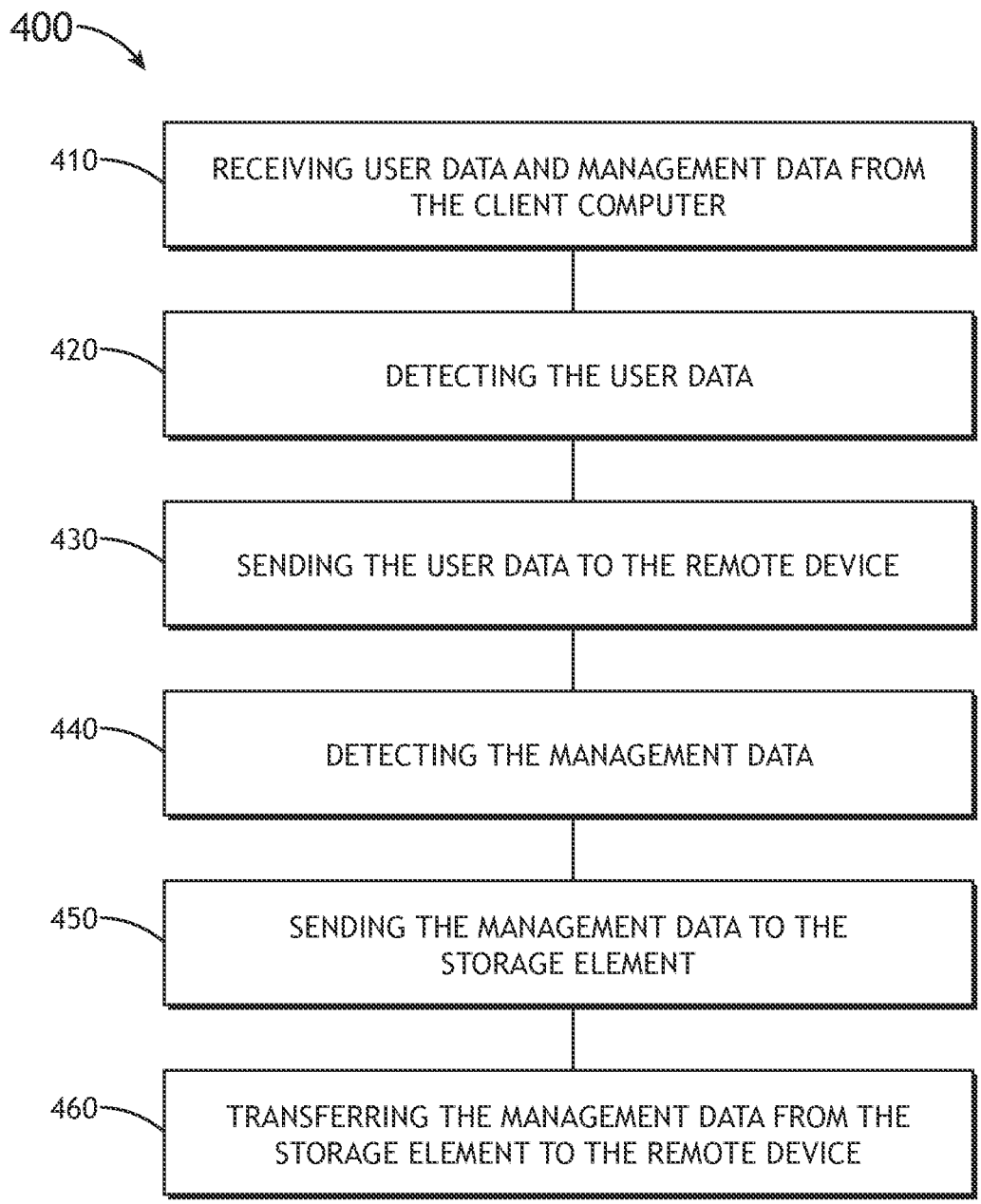
FIG. 4 depicts is a flow diagram illustrating a method for transmitting management data and user data between a client computer and a remote device via the adapter, in accordance with an embodiment of the present disclosure.

Referring to FIG. 4, a flow diagram illustrating a method 400 for transmitting management data and user data between a client computer and a remote device via the adapter, in accordance with an embodiment of the present disclosure is shown. In embodiments, the method 400 includes the step of receiving the user data and the management data from the client computer 410. The user data and the management data are typically configured within separate data streams.

In embodiments, the method 400 further includes a step of detecting the user data 420. For example, the processor within the adapter may be configured to identify user data from the data stream via detection of user data-specific data packet headers. Other methods for identifying user data may also be utilized.

In embodiments, the method 400 further includes a step of sending the user data to the remote device 430. For example, the processor of the adapter may send the user data to the user data receiver-transmitter, which then relays the user data to the remote device via the user data cable.

In embodiments, the method 400 further includes a step of detecting the management data 440. As described herein, the processor of the adapter may be configured to identify management data via detection of management data-specific data packet headers. Other methods for identifying user data may also be utilized.

In embodiments, the method 400 further includes a step of sending the management data to the storage element 450. For example, the processor, once having identified the management data, may then transmit the data to the storage element. The management data may then be transmitted immediately to the remote device, or be stored within the storage element awaiting further instruction.

In embodiments, the method 400 includes a step of transferring the management data from the storage element to the remote device 460. For example, the processor within the controller and/or the storage element may receive a transfer instruction or a transfer instruction schedule from the client computer or external memory to send management data to the management data interface. For instance, the management data may be transferred to the remote device immediately upon the instruction. In another instance, the management data may be transferred to the remote device at an instructed time. Additionally, it is contemplated that transferring the management data from the storage element to the remote device 460 is completed upon prior receipt of user authentication data (e.g. multi-factor authentication data) from the client computer.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be implemented (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be implemented, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

What is claimed:

1. A system, comprising:
an adapter configured to support virtual USB media and transmit management data and user data between a client computer and a remote device, the adapter comprising:
a client interface configured to communicatively couple to the client computer over a network and receive a data stream comprising the management data and the user data from the client computer;
a user data interface configured to communicatively couple directly to the remote device and send the user data to the remote device;
a user data receiver-transmitter configured to communicatively couple to the user data interface and send the user data to the user data interface;
a management data interface configured to communicatively couple to the remote device and send the management data to the remote device;
a storage element configured to receive and store the management data and send the management data to the remote device via the management data interface;
a processor;
a memory having instructions stored upon that, in response to execution by the processor, cause the processor to perform operations comprising:
emulating a USB connection over the network;
detecting the user data from the data stream;
sending the user data to the user data receiver-transmitter;
detecting the management data from the data stream;
sending the management data to the storage element; and
transferring the management data from the storage element to the remote device; and
a housing external to the client computer and the remote device containing the client interface, the user data interface, the user data receiver-transmitter, the management data interface, the storage element, the processor, and the memory, wherein the management data interface is couplable to the remote computer via a management data cable.

2. The system of claim 1, further comprising an external memory, the external memory communicatively coupled to the client computer and configured to store the management data.

3. The system of claim 1, further comprising an RS-232 cable configured to facilitate transfer of user data from the user data interface to the remote device.

4. The system of claim 1, further comprising a universal serial bus cable configured to facilitate transfer of the management data from the management data interface to the remote device.

5. The system of claim 1, wherein the client interface includes a LAN interface or USB interface.

6. The system of claim 1, wherein the user data interface includes a serial port.

7. The system of claim 1, wherein the user data receiver-transmitter is an asynchronous serial communication device.

8. The system of claim 1, wherein the management data interface includes a USB interface.

9. The system of claim 1, wherein the adapter is configured to receive power via a USB connection with the remote device.

10. A method, executed by an adapter configured to support virtual USB media, for transmitting management data and user data between a client computer and a remote device, wherein the adapter is external to the client computer and the remote device, the adapter comprising:
emulating a USB connection over a network;
receiving the user data and the management data from the client computer as a data stream;
detecting the user data from the data stream;
sending the user data to the remote device via a user data cable;
detecting the management data from the data stream;
sending the management data to a storage element; and
transferring the management data from the storage element to the remote device via a management data cable, wherein the adapter includes a housing.

11. The method of claim 10, wherein detecting the user data from the data stream includes detection of user data-specific data packet headers.

12. The method of claim 10, wherein detecting the management data from the data stream includes detection of management data-specific data packet headers.

13. The method of claim 10, wherein the management data includes firmware or update files for the remote device.

14. The method of claim 10, wherein receiving the user data and the management data from the client computer includes receiving data from an external memory connected to the client computer.

15. The method of claim 10, wherein transferring the management data from the storage element to the remote device is completed at a designated time.

16. The method of claim 10, wherein transferring the management data from the storage element to the remote device is completed upon prior receipt of user authentication data from the client computer.

17. The system of claim 1, wherein the adapter is configured as a dongle.

18. The system of claim 1, wherein the adapter emulates the USB connection over the network, forming an emulated adapter, wherein the client computer sends the management data to the emulated adapter, and wherein the remote device receives the management data from the emulated adapter.

19. The system of claim 1, wherein the adapter is configured as a USB cable.

20. The method of claim 10, wherein the adapter is configured as a dongle.

* * * * *